Figure 1:
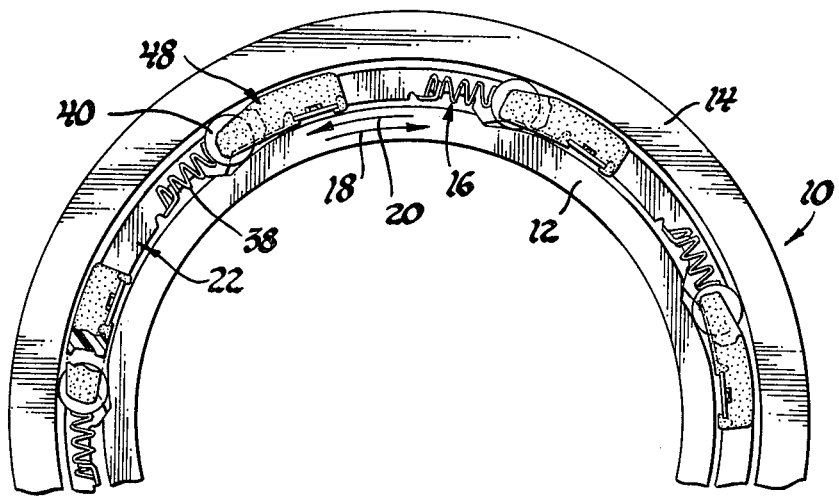

United States Patent [19]

Doller et al.

[11] 4,088,211

[45] May 9, 1978

[54] OVERRUNNING ROLLER CLUTCH WITH IMPROVED CAGE AND BEARING BLOCK

[75] Inventors: John S. Doller, Sandusky; Oscar G. Kitchin, Port Clinton, both of Ohio

[73] Assignee: General Motors Corporation, Detroit, Mich.

[21] Appl. No.: 783,420

[22] Filed: Mar. 31, 1977

[51] Int. Cl.² ............................................. F16D 41/06
[52] U.S. Cl. ....................................................... 192/45
[58] Field of Search ......................... 192/45; 308/217

[56] References Cited

U.S. PATENT DOCUMENTS

| 3,537,555 | 11/1970 | Reister et al. | 192/45 |
| 3,732,956 | 5/1973 | Johnson et al. | 192/45 |
| 3,902,580 | 9/1975 | Johnson | 192/45 |
| 3,972,573 | 8/1976 | Marola | 192/45 X |

*Primary Examiner*—Carlton R. Croyle
*Assistant Examiner*—Michael Koczo, Jr.
*Attorney, Agent, or Firm*—F. J. Fodale

[57] ABSTRACT

An overrunning roller clutch is provided with a stamped and bent sheet metal cage which carries a number of molded bearing blocks. The bearing blocks center the clutch races with respect to each other and also cooperate in providing a unit handled subassembly of caged rollers for the clutch.

5 Claims, 5 Drawing Figures

U.S. Patent  May 9, 1978  4,088,211

OVERRUNNING ROLLER CLUTCH WITH IMPROVED CAGE AND BEARING BLOCK

This invention relates generally to overrunning roller clutches and more particularly to an overrunning roller clutch of the type which includes a cage and bearing block subassembly such as the "One-Way Clutch" disclosed in the U.S. Pat. No. 3,902,580 granted to Lawrence P. Johnson on Sept. 2, 1975 and assigned to the Assignee of this invention.

The cage and bearing block subassembly disclosed in the aforementioned patent while suitable for many purposes does not provide a unit handled subassembly of caged rollers since the outer race is needed to radially retain the bearing blocks in assembly with the cage, and both races are necessary to radially retain the rollers in assembly with the cage.

The U.S. Pat. No. 3,732,956 granted to Lawrence P. Johnson and Oscar G. Kitchin on May 15, 1973 and also assigned to the Assignee of this invention discloses an "Overrunning Clutch" having a unit handled subassembly of cage, rollers and bearing blocks. This subassembly, however, has a somewhat complicated cage structure, requires a compound motion for assembling the bearing blocks to the cage and relies on the lightly loaded tickler springs to retain the bearing blocks as well as the rollers in assembly with the cage.

It is broadly the object of this invention to generally improve upon the cage and bearing block subassemblies disclosed in the aforementioned patents.

Another object of this invention is to provide an improved cage and bearing block subassembly in which the bearing blocks are securely retained on the cage without the presence of either race and without relying on the action of the tickler springs.

Another object of this invention is to provide an improved cage and bearing block subassembly in which the bearing blocks are assembled to and securely retained on the cage in a simple and efficient manner.

Still another object of this invention is to provide an overrunning roller clutch having a unit handled subassembly comprising cage, rollers and bearing blocks securely retained on the cage wherein the rollers but not the bearing blocks are retained in the unit handled subassembly through the action of the tickler springs.

Figure 2:
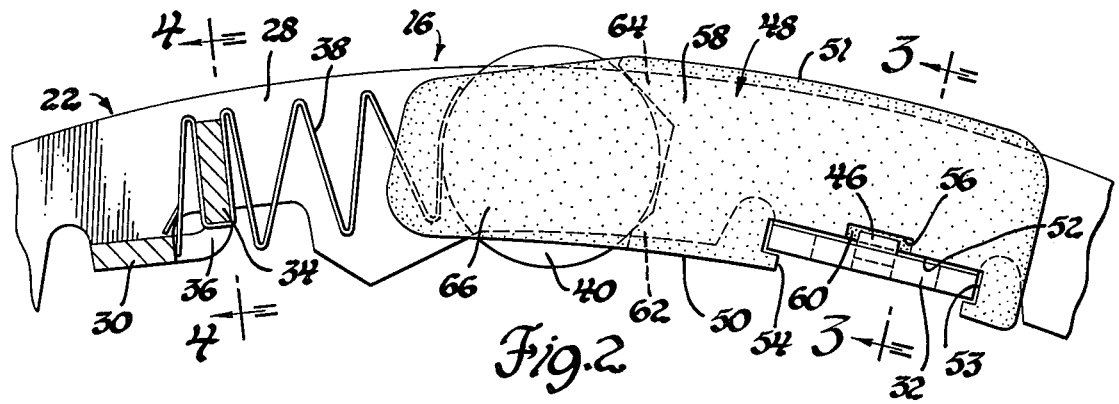
Figure 3:
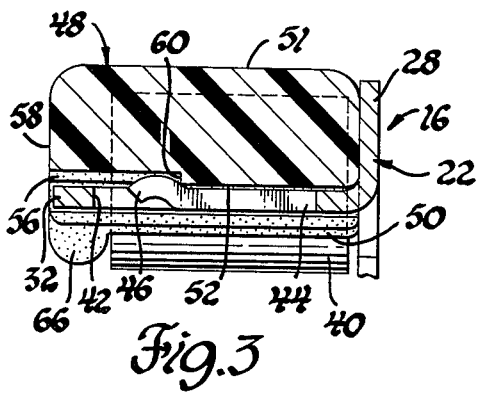
Figure 5:
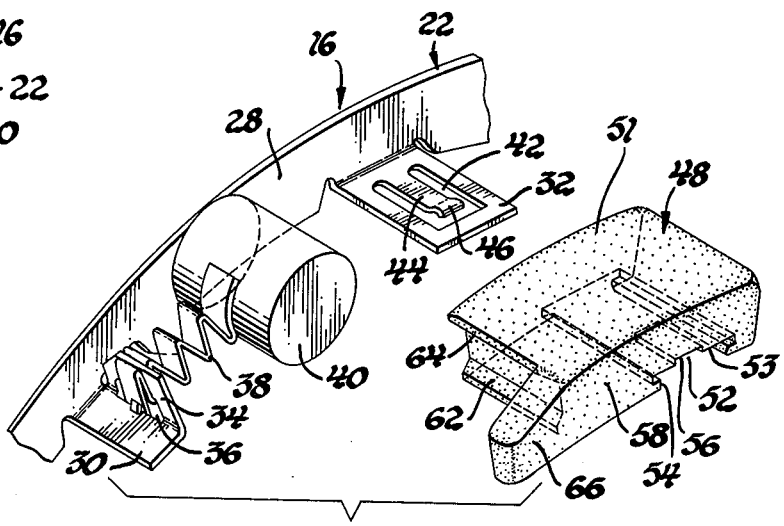
Figure 4:
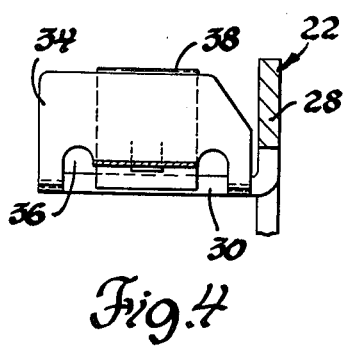

Other objects and features of the invention will become apparent to those skilled in the art as the disclosure is made in the following detailed description of preferred embodiments of the invention as illustrated in the accompanying sheets of drawing in which:

FIG. 1 is a fragmentary front view of an overrunning roller clutch having an improved subassembly in accordance with this invention, FIG. 2 is an enlarged partially sectioned view of a portion of the improved subassembly shown in FIG. 1, FIG. 3 is a section taken substantially along the line 3—3 of FIG. 2, FIG. 4 is a section taken substantially along the line 4—4 of FIG. 2, and FIG. 5 is an exploded perspective view of the subassembly portion shown in FIG. 2.

Referring now to the drawings and more particularly to FIG. 1, this invention is concerned with an overrunning roller clutch indicated generally at 10 comprising an inner race 12 and an outer race 14 having a unit handled caged roller subassembly indicated generally at 16 therebetween. The caged roller subassembly 16 cooperates with the races 12 and 14 to permit the races to rotate relative to one another in one direction while locking the races together in response to relative rotation in the opposite direction. For instance, in the clutch 10 illustrated in FIG. 1, the inner race 12 is freely rotatable in the clockwise direction relative to the race 14 as indicated by the arrow 18. On the other hand, relative rotation in the opposite direction indicated by the arrow 20 is prevented by the rollers locking the races together.

The subassembly 16 includes a one-piece cage 22 generally annular in form and fabricated from sheet metal by stamping and bending operations. The cage 22 comprises a single end ring portion 28, a plurality of circumferentially spaced cantilevered spring retention portions 30 and a plurality of circumferentially spaced cantilevered tab portions 32. The spring retention portions 30 are alternated with the tab portions 32 and both sets are integrally connected to the inner margin of the end ring portion 28 by perpendicular bends so as to extend in cantilevered fashion therefrom in the same axial direction.

Spring retention portions 30 (as best illustrated in FIGS. 2, 4 and 5) each have an upright wall 34 at one end which is slotted at 36 to permit the mounting of the clip portion of an accordian shaped tickler spring 38 on the wall 34. The free end of the tickler spring 38 at the opposite end of the clip portion is curved and engages a roller 40.

Each of the tab portions 32 (as best illustrated in FIGS. 2, 3 and 5) have a central U-shaped slot 42 which defines a cantilevered retention finger 44 having its free end remote from the end ring portion 28. The free end of the finger 44 is bent to provide a curved latch 46 of part cylindrical shape.

The subassembly 16 also includes molded plastic bearing blocks 48 of a low friction material such as nylon. The bearing blocks 48 have inner and outer concentric bearing surfaces 50 and 51 which center the outer race 14 on the inner race 12. These bearing blocks 48 each have a slot 52 which extends through the bearing block in the axial direction. The slot 52 has a middle portion 53 adapted to receive one of the tab portions 32 of the cage, an inner portion 54 of reduced width which intersects the inner bearing surface 50 and a narrow central outer portion 56 which extends only partway back from the front axial end surface 58 to provide a retention shoulder 60. The side of the bearing block 48 toward the rollers 40 (the left side as viewed in FIGS. 1, 2 and 5) has inner and outer retention lips 62 and 64 providing a concave face for radially retaining the roller 40 when it is held against it. The bearing block 48 also has a circumferential extension 66 perpendicular to the concave face. The circumferential extension 66 is axially spaced from the end ring portion 28 of the cage 22 and together with the end ring portion 28 serves to retain the roller 40 in the axial direction.

The bearing blocks 48 are assembled to the cage 22 simply by inserting the tabs 32 into the slots 52 until the curved latches 46 snap into engagement with the latch shoulders 60. Once latched, the bearing blocks 48 are secured in the radial and circumferential direction by the fit between the tab portions 32 and the middle portions 53 of the slots 52. The bearing blocks 48 thus secured, the rollers 40 are then assembled and retained by the bias of the tickler springs 38 and the lips 62 and 64 of the concave faces at the left side of the bearing blocks 48. Axial retention of the rollers 40 is provided by the end ring portion 28 and the bearing block extensions 66. The unit handled caged roller subassembly is shown in FIG. 2. When the subassembly 16 is combined with the races 12 and 14 as shown in FIG. 1, the rollers 40 are backed off the bearing blocks 48 by the profile of the inner race 12. To compensate, the bearing block extensions 66 as shown in FIG. 2 extend past the rollers 40 when positioned against the bearing blocks 48 so that upon assembly with the clutch races 12 and 14 there is adequate axial retention of the rollers 40.

We wish it to be understood that we do not desire to be limited to the exact details of construction shown and described, for obvious modifications will occur to a person skilled in the art.

What is claimed is:

1. A unit handled roller clutch subassembly comprising:
    a sheet metal cage having a single flat end ring portion elongated in a direction perpendicular to a central axis,
    a plurality of circumferentially spaced, tab portions integrally connected to the end ring portion and extending in cantilevered fashion therefrom in an axial direction,
    a plurality of circumferentially spaced spring retainer portions integrally connected to the end ring portion and extending in cantilevered fashion therefrom in the same axial direction, said spring retainer portions being alternated with said tab portions and circumferentially spaced therefrom,
    a plurality of bearing blocks of low friction material having concentric inner and outer bearing surfaces mounted on respective ones of said plurality of tab portions for centering inner and outer clutch races with respect to each other, each of said bearing blocks having an axial slot receiving an associated one of said tab portions for retention in the circumferential and radial directions, and
    snap retention means associated with each of said axial slots for securing said bearing blocks on their associated tab portions in the axial direction, and
    each of said bearing blocks having a concave face for radially retaining a roller held thereagainst and a circumferential extension spaced from said flat end ring portion for retaining such a roller in the axial direction.

2. The unit handled subassembly defined in claim 1 wherein the circumferential extensions of each of said bearing blocks extend past the roller when abutting the concave face of the bearing block to compensate for the roller being backed off the bearing block when the assembly is assembled to inner and outer clutch races.

3. The unit handled subassembly defined in claim 1 wherein said snap retention means comprises a central cantilevered finger on each of said tab portions engaging a retention shoulder in each of said axial slots.

4. The unit handled subassembly defined in claim 3 wherein each of said tabs has a U-shaped cut out which defines the respective cantilevered fingers and wherein the free ends of the cantilevered fingers are remote from the end ring portion and form latches cooperating with internal shoulders in the bearing blocks to axially retain the same on the portions of the cage.

5. The unit handled subassembly defined in claim 4 wherein the tab portions and the spring retainer portions are integrally connected at the inner margin of the end ring portion.

* * * * *